United States Patent
Engstrand

(10) Patent No.: US 7,291,830 B1
(45) Date of Patent: Nov. 6, 2007

(54) LIGHT PIPE, SYSTEM AND METHOD FOR MEASURING LIGHT ATTENUATION

(75) Inventor: Bradley Engstrand, Hartford, WI (US)

(73) Assignee: Phaedrus, LLC, Hartford, WI (US)

( * ) Notice: Subject to any disclaimer, the term of this patent is extended or adjusted under 35 U.S.C. 154(b) by 0 days.

(21) Appl. No.: 11/455,323

(22) Filed: Jun. 19, 2006

(51) Int. Cl.
  *G01J 1/04* (2006.01)
  *G02B 6/00* (2006.01)

(52) U.S. Cl. .................. 250/227.11; 385/12; 385/90

(58) Field of Classification Search ............ 250/227.1, 250/227.13, 227.28, 239, 559.38; 385/9, 385/12, 88, 90, 92; 356/73.1
See application file for complete search history.

(56) References Cited

U.S. PATENT DOCUMENTS

| | | | |
|---|---|---|---|
| 3,368,751 A | | 2/1968 | Merrill |
| 3,885,875 A | | 5/1975 | Howe, Jr. et al. |
| 4,150,299 A | | 4/1979 | Kasiewicz et al. |
| 4,501,642 A | | 2/1985 | Wells |
| 4,661,695 A | | 4/1987 | Mori et al. |
| 4,736,674 A | | 4/1988 | Stoll |
| 4,806,707 A | | 2/1989 | Landmeier |
| 4,902,903 A | | 2/1990 | Segerson et al. |
| 4,970,361 A | * | 11/1990 | Fuse .................. 219/86.41 |
| 5,182,979 A | | 2/1993 | Morgan |
| 5,231,959 A | * | 8/1993 | Smietana .............. 123/90.12 |
| 5,271,505 A | * | 12/1993 | Low ..................... 209/587 |
| 5,705,742 A | * | 1/1998 | Fox et al. ............... 73/116 |
| 5,744,705 A | | 4/1998 | Derouen et al. |
| 5,799,626 A | * | 9/1998 | Ponsford et al. ....... 123/41.42 |
| 5,917,985 A | * | 6/1999 | Im ....................... 385/140 |
| 5,977,778 A | | 11/1999 | Chan et al. |
| 5,988,676 A | * | 11/1999 | Lotito et al. ............ 280/735 |
| 6,058,776 A | * | 5/2000 | Algers et al. ........... 73/304 R |
| 6,952,009 B1 | * | 10/2005 | Engstrand ............ 250/231.1 |
| 2004/0089797 A1 | | 5/2004 | Engstrand |
| 2006/0065822 A1 | | 3/2006 | Engstrand |
| 2007/0069163 A1 | * | 3/2007 | Enstrand ............. 250/559.29 |
| 2007/0075226 A1 | * | 4/2007 | Engstrand ............ 250/231.1 |
| 2007/0075229 A1 | * | 4/2007 | Engstrand ............ 250/231.1 |

* cited by examiner

Primary Examiner—Kevin Pyo
(74) Attorney, Agent, or Firm—Patents + TMS, P.C.

(57) ABSTRACT

A light pipe, a system and a method measure light attenuation from an optical fiber connected to a light source. The optical fiber transmits light from the light source to a light detector to determine a distance between the optical fiber and the light detector. The optical fiber attenuates light outwardly with respect to the fiber. A layer receives the optical fiber to reflect and/or to refract light transmitted by the optical fiber inwardly. A rod prevents light from attenuating from the optical fiber. A microprocessor may be connected to the light detector for determining the amount of light attenuated from the optical fiber. The microprocessor determines the distance between the light detector and the optical fiber based on the amount of light transmitted from the optical fiber to the light detector. The microprocessor transmits an output signal to a transducer for activating an arm to move an end of the layer inwardly or outwardly with respect to an end of the optical fiber. The light attenuated from the optical fiber and/or the light detectable by the light detector may correspond to a distance between the optical fiber and the light detector within an interior of the layer. The microprocessor may identify the distance between the optical fiber and the light detector based on the light measured and/or detected by the light detector from the optical fiber which may not be attenuated from the optical fiber.

20 Claims, 2 Drawing Sheets

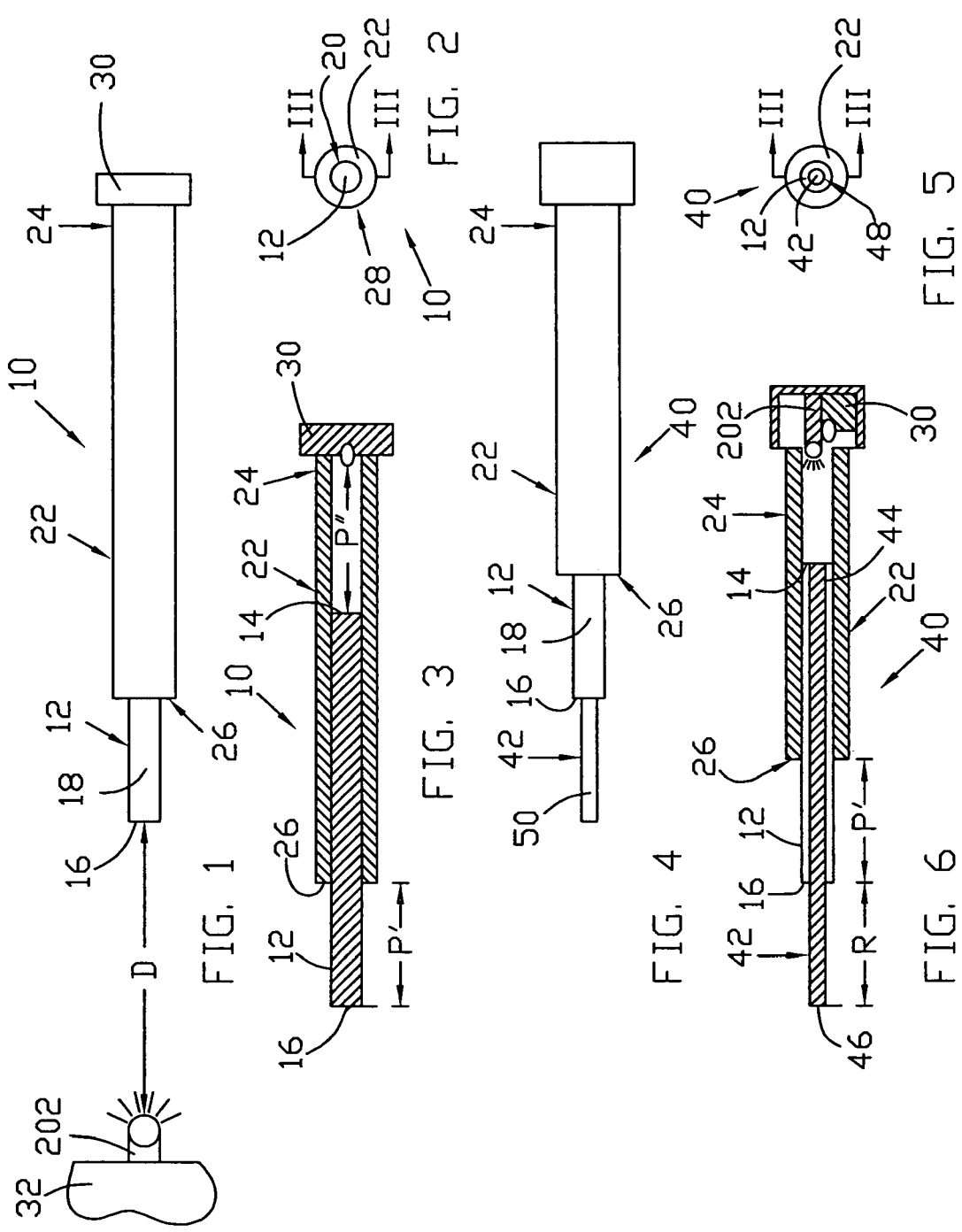

though the detector is exposed by the arm and/or the transducer.

LIGHT PIPE, SYSTEM AND METHOD FOR MEASURING LIGHT ATTENUATION

BACKGROUND OF THE INVENTION

The present invention generally relates to a light pipe, a system and a method for measuring light attenuation. More specifically, the present invention relates to a light pipe, a system and a method for measuring light attenuation which may have an optical fiber connected to the light source for transmitting light from the light source through the optical fiber. A light detector may identify and/or may determine an amount of light which may project from and/or may illuminate from the optical fiber to measure an amount of light that is attenuated by the optical fiber and/or to determine a distance between the optical fiber and the light detector. The optical fiber may be insertable into and/or may extend outwardly from a housing for reflecting and/or for refracting the light of the optical fiber inwardly with respect to a perimeter of the optical fiber. The amount of light detectable by the light detector within the housing may correspond to a portion of the optical fiber extending outwardly from the housing and/or to the distance between the optical fiber and the light detector. An arm may be connected to the housing and the optical fiber for moving an end of the housing inwardly and/or outwardly with respect to an end of the optical fiber. As a result, the portion of the optical fiber may be exposed and/or may be uncovered from the housing to attenuate light outwardly with respect to the optical fiber.

A microprocessor may be electrically connected to and/or may be in communication with a transducer and/or the light source for controlling the amount of light detected by the light detector and/or projected from the optical fiber to the light detector via the housing. The microprocessor may transmit an output signal to the transducer which may be mechanically connected to the arm for moving the end of the arm outwardly or inwardly with respect to the end of the optical fiber for attenuating light from the optical fiber. The arm may increase and/or may decrease the portion of the optical fiber extending outwardly with respect to the housing for controlling the amount of light detectable by the light detector within the housing and/or the amount of light illuminated by the optical fiber. As a result, the microprocessor may control, may alter and/or may adjust the amount of light which may be detected by and/or may be measured by the light detector via the transducer, the arm and/or the housing. It is, of course, generally known to provide an optical fiber for transmitting a light from a light source connected to the optical fiber. A first amount of light from the light source is attenuated, is reflected and/or is refracted outwardly from a center of the optical fiber towards a perimeter of the optical fiber. The first amount of the light projects outwardly from the perimeter of the optical fiber. As a result, the first amount of light is attenuated from the optical fiber via the perimeter of the optical fiber.

A total amount of light transmitted by the optical fiber is reduced by and/or is decreased by the first amount of the light which is projected outwardly from and/or attenuated by the perimeter of the optical fiber. As a result, the total amount of light transmitted by the optical fiber corresponds to the first amount of light which projects from and/or is attenuated by the perimeter of the optical fiber. Since the total amount of light transmitted by the optical fiber corresponds to the first amount of light attenuated by the optical fiber, calculating and/or predicting the total amount of light transmitted by the optical fiber is difficult, impracticable and/or unfeasible. As a result, use of the optical fiber to measure a distance between the optical fiber and a light sensor may be impossible and/or inaccurate because of the first amount of light which may be attenuated from the optical fiber is unpredictable. Moreover, measuring the distance between the optical fiber and the light sensor may be inaccurate because the first amount of light is attenuated from the perimeter of the optical fiber.

A need, therefore, exists for a light pipe, a system and a method for measuring light attenuation. Additionally, a need exists for a light pipe, a system and a method for measuring light attenuation which may provide a housing for preventing light from within an optical fiber from attenuating outwardly with respect to a perimeter of the optical fiber. Further, a need exists for a light pipe, a system and a method for measuring light attenuation which may provide an arm and/or a transducer for moving an end of the housing inwardly or outwardly with respect to an end of the optical fiber for exposing and/or for uncovering a portion of the optical fiber to attenuate light from the optical fiber. Still further, a need exists for a light pipe, a system and a method for measuring light attenuation which may provide a coating, a layer and/or a cladding on a surface of an optical fiber to prevent attenuation of light from the optical fiber. Moreover, a need exists for a light pipe, a system and a method for measuring light attenuation which may provide a rod located within an optical fiber to prevent attenuation of light from the optical fiber. Furthermore, a need exists for a light pipe, a system and a method for measuring light attenuation which may provide a layer and/or a rod to prevent an amount of light within an optical fiber from attenuating outwardly from the optical fiber.

SUMMARY OF THE INVENTION

The present invention provides a light pipe, a system and a method for measuring light attenuation. The light pipe and the system may provide an optical fiber and a light source for transmitting a total amount of light through the optical fiber from the light source. A light detector may determine the total amount of light which may not be attenuated outwardly from the perimeter of the optical fiber to determine a distance between the light detector and the optical fiber. The optical fiber may have a layer which may surround the optical fiber to reflect and/or to refract light away from the perimeter of the optical fiber. The optical fiber may have a rod within the perimeter of the optical fiber to prevent light within the optical fiber from attenuating outwardly with respect to the perimeter of the optical fiber. As a result, an attenuated amount of light may be reduced and/or may be minimized by the layer and/or by the rod within the optical fiber. The total amount of light determined by and/or measured by the light detector may correspond to the distance between the optical fiber and the light detector and/or to the amount of light attenuated from the optical fiber. An arm and/or a transducer may be connected to the layer for moving an end of the layer inwardly or outwardly with respect to an end of the optical fiber to control and/or to alter a portion of the optical fiber which extends outwardly with respect to the layer. As a result, the transducer may expose and/or may uncover the portion of the optical fiber to attenuate light outwardly with respect to the perimeter of the optical fiber.

The microprocessor may transmit an output signal to a transducer which may move an arm for changing, for altering and/or for moving the end of the cover with respect to the end of the optical fiber. The microprocessor may be electrically connected to the light detector for receiving a first signal indicative of the total light transmitted from the optical fiber and/or of the distance between the optical fiber and the light detector. The arm may change, may alter, may increase and/or decrease the portion of the optical fiber extending outwardly from the layer to alter and/or to change the total amount of light transmitted from the optical fiber. As a result, the amount of light transmitted from the optical fiber and/or from the portion of the optical fiber may correspond to and/or may be based on the distance between the light detector and the optical fiber.

To this end, in an embodiment of the present invention, a light pipe for measuring light attenuation us provided. The light pipe has an optical fiber having a length defined between a first end and a second end wherein light is transmittable through the optical fiber between the first end and the second end wherein the light is projected into the optical fiber. Further, the light pipe has a layer having a passage and a length defined between a first end and a second end wherein the passage extends from the first end through the layer to the second end of the layer wherein the optical fiber is inserted into the passage of the layer wherein the first end of the optical fiber is adjacent to the first end of the layer wherein a portion of the optical fiber extends outwardly from the second end of the layer wherein the portion of the optical fiber attenuates a first amount of the light projected into the optical fiber. Still further, the light pipe has a light detector connected to the first end of the layer wherein the optical fiber projects a second amount of light into the passage of the layer wherein the light detector is adjacent to the passage of the layer wherein the light detector determines the second amount of light within the passage wherein the second amount of light corresponds to the first amount of light attenuated from the portion of the optical fiber. Moreover, the light pipe has a microprocessor connected to the light detector wherein the microprocessor determines a distance between the optical fiber and the light detector wherein the distance between the optical fiber and the light detector corresponds to the second amount of light determined by the light detector.

In an embodiment, the light pipe has a light source associated with the optical fiber wherein the light source transmits light into the optical fiber.

In an embodiment, the light pipe has a rod connected to the optical fiber wherein the rod alters the first amount of light attenuated from the portion of the optical fiber.

In an embodiment, the light pipe has a transducer connected to the microprocessor wherein the transducer alters the first amount of light attenuated from the portion of the optical fiber.

In an embodiment, the light pipe has an arm connected to the layer wherein the arm changes the portion of the optical fiber extending outwardly with respect to the second end of the layer.

In an embodiment, the microprocessor controls the first amount of light attenuated from the portion of the optical fiber.

In another embodiment of the present invention, a system for measuring light attenuation is provided. The system has an optical fiber having a length defined between a first end and a second end wherein light illuminates the optical fiber between the first end and the second end wherein the first end of the optical fiber projects light. Further, the system has a layer having a passage and a length defined between a first end and a second end wherein the passage extends from the first end of the layer through the layer to the second end of the layer wherein the optical fiber is located within the passage of the layer wherein the first end of the optical fiber is adjacent to the first end of the layer wherein a portion of the optical fiber extends outwardly with respect to the second end of the layer wherein the portion of the optical fiber attenuates an amount of light wherein the optical fiber is separated from the first end of the layer by a distance wherein the distance corresponds to the amount of light attenuated from the portion of the optical fiber. Moreover, the system has a microprocessor connected to the optical fiber and the layer wherein the microprocessor determines the amount of light attenuated from the portion of the optical fiber wherein the microprocessor determines the distance between the optical fiber and the first end of the layer via the amount of light attenuated from the portion of the optical fiber.

In an embodiment, the system has a light detector connected to the first end of the layer and the microprocessor wherein the light detector measures light transmitted from the first end of the optical fiber.

In an embodiment, the system has a light source that projects light wherein the light from the light source illuminates the optical fiber.

In an embodiment, the system has a rod inserted into the optical fiber wherein the rod alters the amount of light attenuated from the portion of the optical fiber.

In an embodiment, the system has an arm connected to the layer wherein the arm changes the portion of the optical fiber extending outwardly with respect to the second end of the layer.

In an embodiment, the system has a transducer connected to the microprocessor wherein the transducer controls the amount of light attenuated from the portion of the optical fiber.

In another embodiment of the present invention, a method for measuring light attenuation is provided. The method has the step of providing a light pipe having an optical fiber and a layer wherein the layer has a length defined between a first end and a second end of the layer wherein the optical fiber has a length defined between a first end and a second end of the fiber wherein the optical fiber is inserted into the layer wherein the first end of the optical fiber is adjacent to the first end of the layer wherein a portion of the optical fiber extends outwardly with respect to the second end of the layer. Further, the method has the step of attenuating a first amount of light from the portion of the optical fiber extending outwardly with respect to the second end of the layer. Moreover, the method has the step of determining a distance between the first end of the optical fiber and the first end of the layer wherein the distance corresponds to the first amount of light attenuated from the portion of the optical fiber.

In an embodiment, the method has the step of determining a second amount of light transmitted from the first end of the optical fiber wherein the second amount of light corresponds to the distance between the first end of the layer and the optical fiber.

In an embodiment, the method has the step of changing the distance between the first end of the layer and the optical fiber to alter the first amount of light attenuated from the optical fiber.

In an embodiment, the method has the step of inserting a rod into the optical fiber wherein the rod alters the first amount of light attenuated from the portion of optical fiber.

In an embodiment, the method has the step of moving the second end of the layer with respect to the second end of the optical fiber wherein the portion of the optical fiber is changed via the second end of the layer In an embodiment, the method has the step of changing the first amount of light attenuated from the portion of the optical fiber wherein the first amount corresponds to the portion of the optical fiber extending outwardly with respect to the layer.

In an embodiment, the method has the step of attaching a cap to the first end of the layer wherein the cap encloses the passage of the layer at the first end of the layer.

In an embodiment, the method has the step of connecting a microprocessor to the layer and the optical fiber wherein the microprocessor determines the distance between the optical fiber and the second end of the layer.

It is, therefore, an advantage of the present invention to provide a light pipe, a system and a method for measuring light attenuation which may provide an optical fiber and a light detector for determining a distance between the optical fiber and the light detector.

Another advantage of the present invention is to provide a light pipe, a system and a method for measuring light attenuation which may reduce an amount of light which may be attenuated outwardly from a perimeter of and/or from an exterior surface of an optical fiber.

Yet another advantage of the present invention is to provide a light pipe, a system and a method for measuring light attenuation which may provide a coating and/or a layer located on an exterior surface of an optical fiber to prevent light from being attenuated outwardly from the optical fiber.

A still further advantage of the present invention is to provide a light pipe, a system and a method for measuring light attenuation which provide a layer for an optical fiber which may reflect and/or may refract light away from a perimeter of the optical fiber.

Another advantage of the present invention is to provide a light pipe, a system and a method for measuring light attenuation which may move a portion of an optical fiber for attenuating an amount of light from the optical fiber to determine a distance from the optical fiber and a light detector.

A still further advantage of the present invention is to provide a light pipe, a system and a method for measuring light attenuation which may provide an arm and/or a transducer to move an end of a cover inwardly or outwardly with respect to an end of the optical fiber to attenuate light outwardly from the optical fiber.

Yet another advantage of the present invention is to provide a light pipe, a system and a method for measuring light attenuation which may measure an amount of light transmitted by an optical fiber to determine a distance between the optical fiber and a light detector.

Another advantage of the present invention is to provide a light pipe, a system and a method for measuring light attenuation which may provide a microprocessor electrically connected to a light detector to determine an amount of light transmitted from an optical fiber or a distance between the light detector and the optical fiber.

And, another advantage of the present invention is to provide a light pipe, a system and a method for measuring light attenuation which may transmit an output signal from a microprocessor to move an end of a cover with respect to an end of the optical fiber to determine a distance between the optical fiber and a light detector.

A still further advantage of the present invention is to provide a light pipe, a system and a method for measuring light attenuation which may provide a cladding and/or a layer around an optical fiber for reducing an amount of light attenuated from the optical fiber.

Yet another advantage of the present invention is to provide a light pipe, a system and a method for measuring light attenuation which provides a light source and a light detector adjacent to an end of the optical fiber for determining an amount of light attenuated from an optical fiber and/or a distance between the end of the optical fiber and the light detector.

A still further advantage of the present invention is to provide a light pipe, a system and a method for measuring light attenuation which may control and/or may change an amount of light transmitted from an optical fiber to determine a distance between the optical fiber and a light detector.

Another advantage of the present invention is to provide a light pipe, a system and a method for measuring light attenuation which may provide an optical fiber having a first refractive index and a layer having a second refractive index for preventing the optical fiber from attenuating light transmitted through the optical fiber.

A still further advantage of the present invention is to provide a light pipe, a system and a method for measuring light attenuation which attenuates an amount of light with respect to an exterior surface of an optical fiber to determine a distance between the optical fiber and a light detector.

Additional features and advantages of the present invention are described in, and will be apparent from, the detailed description of the presently preferred embodiments and from the drawings.

BRIEF DESCRIPTION OF THE DRAWINGS

FIG. 1 illustrates a side plan view of a light pipe and a light detector in an embodiment of the present invention.

FIG. 2 illustrates a front plan view of the light pipe of FIG. 1 in an embodiment of the present invention.

FIG. 3 illustrates a cross-sectional view of the light pipe of FIG. 2 taken substantially along the line III-III in an embodiment of the present invention.

FIG. 4 illustrates a side plan view of a light pipe in an embodiment of the present invention.

FIG. 5 illustrates a front plan view of the light pipe of FIG. 4 in an embodiment of the present invention.

FIG. 6 illustrates a cross-sectional view of the light pipe of FIG. 5 taken substantially along the ling VI-VI in an embodiment of the present invention.

DETAILED DESCRIPTION OF THE PRESENTLY PREFERRED EMBODIMENTS

Figure 7:
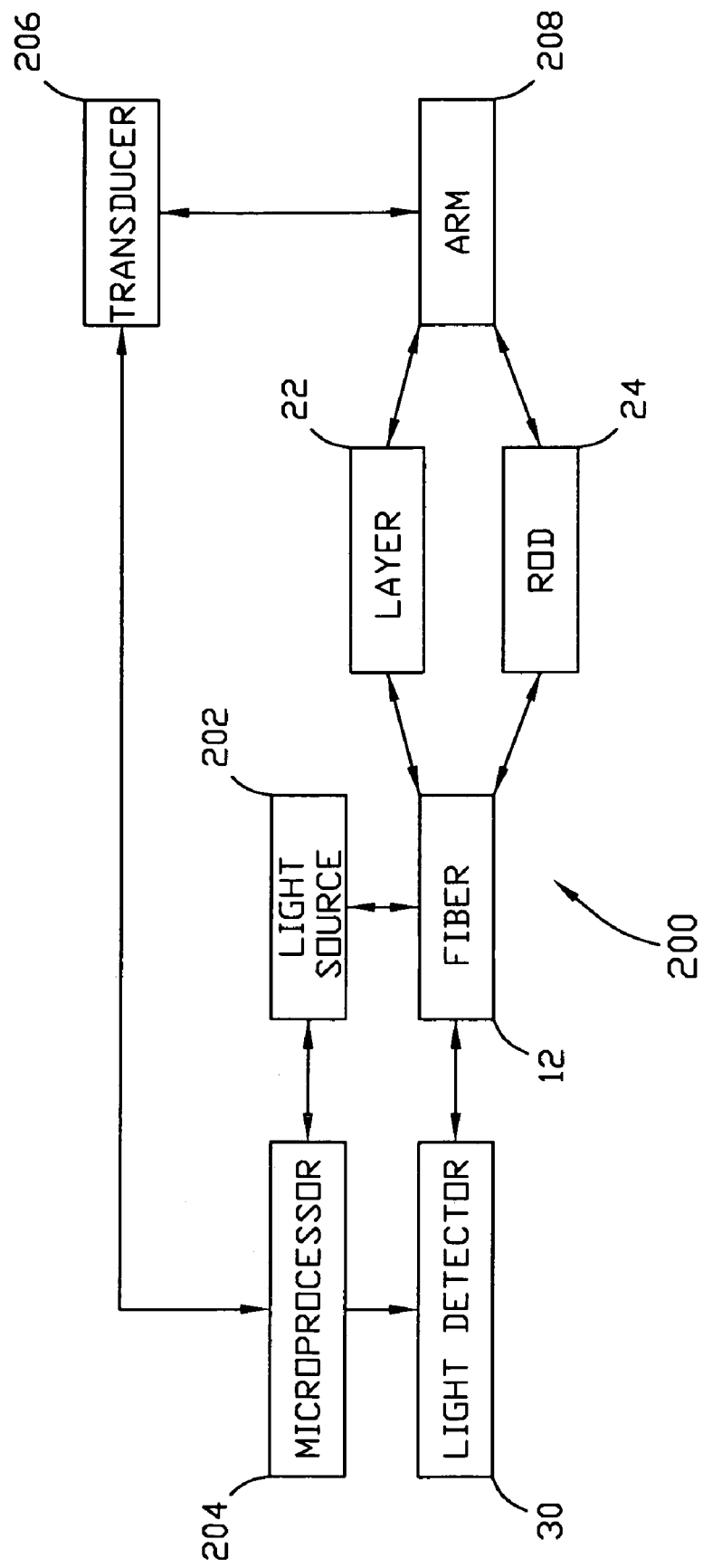
FIG. 7 illustrates a black box diagram of a system for measuring light attenuation in an embodiment of the present invention.

The present invention generally relates to a light pipe, a system and a method for measuring light attenuation. The light pipe and the system may have an optical fiber for transmitting light from a light source to a light detector to determine a distance between the optical fiber and the light detector. The optical fiber may have a perimeter and/or an exterior surface which may attenuate an amount of light outwardly with respect to the optical fiber. A layer may cover and/or may contact the exterior surface of the optical fiber for preventing the light within the optical fiber from attenuating outwardly with respect to the exterior surface and/or the perimeter of the optical fiber. The layer may receive the optical fiber to reflect and/or to refract light transmitted by the optical fiber inwardly towards the optical fiber. A rod may be located within the optical fiber for preventing light from being attenuated from the exterior surface and/or the perimeter of the optical fiber.

A microprocessor may be electrically connected to the light detector for determining and/or for identifying an amount of light which is attenuated outwardly with respect to the exterior surface of the optical fiber. Further, the microprocessor may determine and/or may identify the distance between the light detector and the optical fiber via the light projected from the optical fiber through an interior of the layer. The amount of light attenuated from the optical fiber and/or the amount of light measured by the light detector may correspond to the portion of the optical fiber extending outwardly with respect to the layer and/or to a distance between the optical fiber and the light detector. An arm may be attached to the transducer for moving the end of the cover inwardly or outwardly with respect to the end of the optical fiber for attenuating light outwardly from the portion of the optical fiber. As a result, the microprocessor may control the amount of light which may be attenuated by the optical fiber via the transducer and/or the arm. Moreover, the microprocessor may be programmed to measure the distance between the optical fiber and the light detector based on the amount of light received by the light detector from the optical fiber which may not be attenuated from the exterior surface of the fiber.

Referring now to the drawings wherein like numerals refer to like parts, FIGS. 1-3 illustrate a light pipe 10 (hereinafter "the pipe 10") in an embodiment of the present invention. The pipe 10 may have an optical fiber 12 (hereinafter "the fiber 12") for transmitting light which may be projected from a light source 202. The light source may be attached to a surface 32 which may be located adjacent to the pipe 10. The fiber 12 may have a first end 14 and a second end 16 which may be located adjacent to the light source 202. The second end 16 may be located at a position opposite to the first end 14. The second end 16 of the fiber 12 may be optically connected to the light source 202 for transmitting light from the second end 16 to the first end 14 of the fiber 12 of the pipe 10. In an embodiment, the second end 16 of the fiber 12 may abut and/or may contact the light source 202 for transmitting light from the second end 16 to the first end 14 of the fiber 12. The light source 202 may be separated from the second end 16 of the fiber 12 by a distance D for transmitting light into the fiber 12. An amount of light transmitted into and/or projected into the fiber 12 may be based on and/or may correspond to the distance D between the light source 202 and the second end 16 of the fiber 12. As a result, the amount of light received by the fiber 12 from the light source 202 may illuminate the fiber 12 between the second end 16 and the first end 14 of the fiber 12.

The fiber 12 may have an exterior surface 18 and a perimeter 20 for transmitting and for projecting the light from the light source 202 outwardly with respect to the first end 14 and/or the exterior surface 18 at the second end 16 of the fiber 12. The perimeter 20 of the fiber 12 may have a cross-sectional shape, such as, for example, circular, oval, rectangular, hexagonal and/or the like. The present invention should not be deemed as limited to a specific embodiment of the cross-sectional shape of the perimeter 20 of the fiber 12.

The fiber 12 may be made from a material which may be illuminated by the light being transmitted from the light source 202. The fiber 12 may be made from transparent material, such as, for example, silica, glass, plastic and/or the like. As a result, the light from the light source 202 may be transmitted and/or may be projected through the fiber 12 from the second end 16 to the first end 14 of the fiber 12. The material of the fiber 12 may have a first refractive index for transmitting the light from the second end 16 to the first end 14 of the fiber 12. It should be understood that the material of the fiber 12 may be any material capable of transmitting light from the second end 16 to the first end 14 of the fiber 12 as known to one of ordinary skill in the art.

The fiber 12 may be made of a material which may reflect and/or may refract the light from the light source 202 outwardly towards the exterior surface 18 and/or the perimeter 20 of the fiber 12. As a result, a first amount of light transmitted via the fiber 12 from the light source 202 may be diffused and/or may be attenuated outwardly with respect to the exterior surface 18 and/or the perimeter 20 of the fiber 12. The first amount of light attenuated by the fiber 12 may illuminate from and/or may project from the exterior surface 18 of the fiber 12. A second amount of light which may not be attenuated by the fiber 12 may illuminate from and/or may be projected from the first end 14 of the fiber 12.

A total amount of light transmitted by and/or projected from the light source 202 to the first end 14 of the fiber 12 may correspond to and/or may be based on the first amount of light which may be attenuated from the fiber 12. Further, the total amount of light transmitted by and/or projected from the light source 202 to the first end 14 of the fiber 12 may correspond to and/or may be based on the second amount of light which may not be attenuated from the fiber 12. Reducing the first amount of light attenuated by the fiber 12 may increase the total amount of light which may be transmitted from the second end 16 to the first end 14 of the fiber 12.

In an embodiment, the exterior surface 18 of the fiber 12 may be polished, may be roughened and/or may be sanded to prevent the first amount of light from being attenuated from the fiber 12. The exterior surface 18 may reflect and/or may refract the light within the fiber 12 inwardly towards the fiber 12 and/or away from the perimeter 20 of the fiber 12. As a result, the first amount of light which may be attenuated by the fiber 12 may be reduced and/or may be minimized via the exterior surface 18. Further, the total amount of light transmitted from the second end 16 to the first end 14 of the fiber 12 may be maximized and/or may be increased via the exterior surface 18.

The light source 202 may transmit, may emit and/or may project light into the second end 16 of the fiber 12 to illuminate the fiber 12 within the exterior surface 18 and/or within the perimeter 20 of the fiber 12. The light source 202 may be, for example, a light emitting diode, a halogen light, a fluorescent light, an incandescent light, a neon light and/or the like. In an embodiment, the light source 202 may be a laser diode, such as, for example, a double hetero-structure laser, a quantum well laser, a distributed feedback laser, a vertical cavity surface emitting laser and/or the like. The light emitted from the light source 202 may be continuous, uninterrupted and/or may be uniform within the fiber 12 and/or between the exterior surface 18 of the fiber 12. The present invention should not be deemed as limited to a specific embodiment of the light source 202.

The light pipe 10 may have a layer 22 which may house, may receive and/or may cover the fiber 12. The layer 22 may be, for example, a coating to cover, to encase, to enclose and/or to surround the exterior surface 18 of the fiber 12. The layer 22 may be adjacent to, may abut and/or may contact the exterior surface 18 of the fiber 12 for covering the fiber 12. The layer 22 may have a first end 24 and a second end 26 which may be located at a position opposite to the first end 24 of the layer 22. The layer 22 may have a passage 23 which may extend from the first end 24 through the layer 22 to the second end 26 of the layer 22. The first end 24 of the layer 22 may be adjacent to the first end 14 of the fiber 12 and/or to the light source 202.

In an embodiment, the second end 26 of the layer 22 may abut and/or may contact the light source 202 for attaching and/or for mechanically connecting the layer 22 and/or the fiber 12 to the light source 202. As shown in FIG. 2, a perimeter 28 of the layer 22 may have a cross-sectional shape, such as, for example, circular, oval, rectangular, hexagonal and/or the like. In an embodiment, the cross-sectional shape of the perimeter 28 of the layer 22 may correspond to and/or may be based on the cross-sectional shape of the perimeter 20 of the fiber 12. The present invention should not be deemed as limited to a specific embodiment of the cross-sectional shape of the perimeter 28 of the layer 22.

In an embodiment, the layer 22 may be, for example, a cladding which may be made from a reflective substance for reflecting and/or for refracting the light attenuated outwardly towards the exterior surface 18 of and/or towards the perimeter 20 of the fiber 12. In an embodiment, the layer 22 may be made from a material which may have a second refractive index for reflecting and/or for refracting the light attenuated outwardly towards the exterior surface 18 of and/or towards the perimeter 20 of the fiber 12. The second refractive index of the layer 22 may be less than the first refractive index of the fiber 12 for reflecting and/or for refracting the light attenuated outwardly towards the exterior surface 18 of the fiber 12. The light attenuated outwardly towards the exterior surface 18 may be reflected and/or may be refracted inwardly with respect to the fiber 20 via the layer 22. As a result, the layer 22 may reduce and/or may minimize the first amount of light which may be attenuated from the fiber 12.

In an embodiment, the layer 22 may prevent light within the fiber 12 from attenuating outwardly with respect to the exterior surface 18 of the fiber 12. Further, the layer 22 may increase and/or may maximize the second amount of light which may not be attenuated from the fiber 12. In an embodiment, the layer 22 may prevent light within the fiber 12 from attenuating outwardly with respect to the exterior surface 18 of the fiber 12. As a result, the total amount of light transmitted from the second end 16 to the first end 14 of the fiber 12 may be increased and/or may be maximized via the layer 22.

As shown in FIG. 1, a light detector 30 may be attached to and/or may be connected to the first end 24 of the layer 22 for detecting, for measuring, for sensing, for identifying and/or for determining the total amount of light transmitted from and/or projecting from the first end 14 of the fiber 12 into the passage 23 of the layer 22. The light detector 30 may extend inwardly towards and/or may be located within the passage 23 of the layer 22. The light detector 30 may cover and/or may enclose the passage 23 of the layer 22. The light detector 30 may be adjacent to the first end 14 of the fiber 12 for detecting light transmitted and/or projected into the interior 23 of the layer 22.

The light source 202 and/or the light detector 30 may be electrically connected to a microprocessor 204 as shown in FIG. 7. In an embodiment, the light detector 30 may determine, may detect, may identify and/or may measure the total amount of light transmitted and/or projected from the first end 14 of the fiber 12. The light detector 30 may transmit a first signal to the microprocessor 204 which may be indicative of the total amount of light detected by the light detector 30 from the first end 14 of the fiber 12 within the passage 23 of the layer 22. The total amount of light may correspond to and/or may be based on the distance D between the light detector 30 and the second end 16. The second end 16 of the fiber 12 may extend outwardly a distance P' from the second end 26 of the layer 22. The exterior surface 18 of the fiber may attenuate the first amount of light from the fiber 12 between the second end 16 of the fiber 12 and the second end 26 of the layer 22. The first amount of light attenuated from the fiber 12 may be based on, may correspond to and/or may be associated with distance P' between the second end 16 of the fiber 12 and the second end 26 of the layer 22.

The microprocessor 204 may be programmed to determine and/or to identify the total amount of light detected by the light detector 30 via the first signal received from the light detector 30. The microprocessor 204 may be programmed to determine and/or to identify the distance P' between the second end 16 of the fiber 12 and the second end 26 of the layer 22 via the first signal and/or via the total amount of light detected by the light detector 30. As a result, the microprocessor 204 may measure and/or may determine the distance P' via the light detector 30 and/or via the total light detected by the light detector 30.

The first end 14 of the fiber 12 may be separated from the light detector 30 by a distance P" as shown in FIG. 3. The total amount of light detected within the passage 23 of the layer 22 by the light detector 30 may correspond to, may be based on and/or may be associated with the distance P'" between the first end 14 of the fiber 12 and the light detector 30. The microprocessor 204 may be programmed to determine and/or to identify the distance P'" between the first end 14 of the fiber and the light detector 30 via the first signal received from the light detector 30 and/or via the total amount of light detected by the light detector 30. As a result, the microprocessor 204 may measure and/or may determine the distance P'" via the light detector 30 and/or via the total amount of light detected within the passage 23 of the layer 22.

In an embodiment, the fiber 12 and the layer 22 may be movable with respect to each other to control and/or to adjust the first amount of light which may be attenuated from the fiber 12 via the exterior surface 18 of the fiber 12. As shown in FIG. 3, the second end 16 of the fiber 12 may be separated from the second end 26 of the layer 22 by the distance P'. As a result, the fiber 12 may extend outwardly with respect to the second end 26 of the layer for the distance P'. The first amount of light may be attenuated outwardly from the exterior surface 18 of the fiber 12 between the second end 26 of the layer 22 to the second end 16 of the fiber 12. The first amount of light which may be attenuated from the fiber 12 may correspond to and/or may be based on the distance P' between the second end 16 of the fiber 12 and the second end 26 of the layer 22.

In an embodiment, the light detector 30 may determine, may detect, may identify and/or may measure the first amount of light which may be attenuated from the fiber 12 between the second end 16 of the fiber 12 and the second end 26 of the layer 22. The light detector 30 may transmit a second signal to the microprocessor 204 indicative of the first amount of light which may be attenuated from the fiber 12 between the second end 16 of the fiber 12 and the second end 26 of the layer 22. The microprocessor 204 may be programmed to determine and/or to identify the first amount of light which may be attenuated from the fiber 12 between the second end 16 of the fiber 12 and the second end 26 of the layer 22 via the second signal from the light detector 30.

The first amount of light attenuated from the fiber 12 between the second end 16 of the fiber 12 and the second end 26 of the layer 22 may correspond to the distance D between the light source 202 and second end 16 of the fiber 12 and/or to the distance P''' between the first end 14 of the fiber 12 and the light detector 30. The microprocessor 204 may be programmed to determine and/or to measure the distance D and/or the distance P''' via the first amount of light attenuated from the fiber 12 between the second end 16 of the fiber 12 and the second end 26 of the cover 22. In an embodiment, the microprocessor 204 may be programmed to determine and/or to measure the distance P' between the second end 16 of the fiber 12 and the second end 26 of the layer 22 via the first amount of light attenuated from the fiber 12 between the second end 16 of the fiber 12 and the second end 26 of the cover 22.

In an embodiment, the microprocessor 204 may be electrically connected to a transducer 206 for controlling, for adjusting and/or for changing the distance D between the light source 202 and the second end 16 of the fiber 12 and/or the distance P' between the second end 16 of the fiber 12 and the second end 26 of the layer 22 as shown in FIG. 7. As a result, the transducer 206 may control, may adjust and/or may change the distance P''' between the first end 14 of the fiber 12 and the light detector 30. The microprocessor 204 may transmit an output signal to the transducer 206 for moving the second end 26 of the layer 22 with respect to the light detector 30 and/or with respect to the second end 16 of the fiber 12. The transducer 206 may be mechanically attached to an arm 208 for moving the fiber 12 and/or the layer 22 with respect to the light detector 30. Further, the transducer 206 may be mechanically attached to the arm 208 for moving the second end 26 of the layer 22 with respect to the second end 16 of the fiber 12.

The output signal from the microprocessor 204 may instruct the transducer 206 to control and/or to move the arm 208 via the output signal received from the microprocessor 204. The arm 208 may move the second end 26 of the layer 22 inwardly or outwardly with respect to the second end 16 of the fiber 12 to change and/or to alter the distance P' and/or the distance P'''. The transducer 206 may increase and/or may decrease the distance P' between the second end 16, of the fiber 12 and the second end 26 of the layer 22 via the arm 208. As a result, the transducer 206 may increase and/or may decrease the distance P''' between the first end 14 of the fiber 12 and the light detector 30 via the arm 208. The output signal from the microprocessor 204 may instruct the transducer 206 to control the arm 208 for moving the second end 16 of the fiber 12 with respect to the light detector 30 and/or for moving the second end 26 of the layer 22 with respect to the second end 16 of the fiber 12. The arm 208 may move the second end 16 of the fiber 12 inwardly or outwardly with respect to the light detector 30. The transducer 206 may increase, may decrease, may control, may alter and/or may change the distance D, the distance P' and/or the distance P'''.

FIGS. 4-6 illustrate a light pipe 40 (hereinafter "the pipe 40") in another embodiment of the present invention. The first end 14 of the fiber 12 may be located and/or may be positioned adjacent to the first end 24 of the layer 22. The second end 16 of the fiber 12 may be separated from the second end 26 of the layer 22 by the distance P'. A cap 41 may be attached the first end 24 of the layer 22 for covering and/or for enclosing the passage 23 of the layer 22 at the first end 24 of the layer 22. The cap 41 may have an interior 43 for housing and/or for storing the light source 202 and/or the light detector 30 to projecting and/or to transmitting light into the passage 23 of the layer 22 and/or the first end 14 of the fiber 12. The light source may be located within and/or may be positioned within the interior 43 of the cap 41. Light transmitted from the light source 202 may illuminate the fiber 12 from the first end 14 through the fiber 12 to the second end 16 of the fiber 12.

The light source 202 may be located within, may be position within the passage 23 of the layer 22 for transmitting light into the passage 23 and/or into the fiber 12. The second end 16 of the fiber 12 may attenuate and/or may diffuse the first amount of light. Light which may not have been attenuated from the fiber 12 may be transmitted and/or may be projected from the first end 14 of the fiber 12 into the passage 23 at the first end 24 of the layer 22. As a result, the total amount of light may illuminate and/or may be projected into the passage 23 of at the first end 24 of the layer 22 for determining and/or for measuring the distance P' between the second end 16 of the fiber 12 and the layer 22 and/or the distance P''' between the optical fiber 12 and the light detector 30.

The light detector 30 may be located at a position adjacent to the light source 202, the first end 24 of the layer 22 and/or the passage 23 of the layer 22. The light detector 30 may be located within and/or may be positioned within the interior 43 of the cap 41 for detecting light within the interior 43 of the cap 41 and/or within the passage 23 at the first end 24 of the layer 22. The light detector 30 may detect, may determine and/or may measure the total amount of light transmitted from the first end 14 of the fiber 12 into the interior 43 of the cap 41 and/or into the passage 23 at the first end 24 of the layer 22.

The transducer 206 and/or the arm 208 may be attached to the layer 22 and/or the fiber 12 of the pipe 40 for controlling, for adjusting and/or for altering the distance P' between the second end 16 of the fiber 12 from the second end 26 of the layer 22 and/or the distance P''' between the first end 14 of the fiber 12 and the light detector 30. The first amount of light which attenuates from the fiber 12 between the second end 16 of the fiber 12 and the second end 26 of the layer 22 may correspond to, may be associated with and/or may be based on the distance P' and/or on the distance P'''. The light detector 30 may determine and/or may detect the total amount of light within the passage 23 to identify and/or to measure the distance P' and/or the distance P'''.

A rod 42 may be located within and/or may be positioned within the fiber 12 of the pipe 40. The rod 42 may have a first end 44 and a second end 46 which may be located at a position opposite to the first end 44. The first end 44 of the rod 42 may be adjacent to the first end 14 of the fiber 12 and/or to the first end 24 of the layer 22. The second end 46 of the rod 42 may be adjacent to the second end 16 of the fiber 12 and/or to the second end 26 of the layer 22. The rod 42 may extend through the fiber 12 from the first end 14 to the second end 16 of the fiber 12. The second end 46 of the rod 42 may extend outwardly with respect to the second end 16 of the fiber 12 and/or with respect to the second end 26 of the layer 22. The rod 42 may be movable or may be stationary with respect to the fiber 12 and/or with respect to the layer 22.

The rod 42 may have a perimeter 48 and/or an exterior surface 50 as shown in FIG. 4. The perimeter 48 may have a cross-sectional shape, such as, for example, circular, oval, rectangular, hexagonal and/or the like. In an embodiment, the cross-sectional shape of the perimeter 48 of the rod 42 may correspond to and/or may be based on the cross-sectional shape of the perimeter 28 of the layer 22 and/or the perimeter 20 of the fiber 12. The present invention should not be deemed as limited to a specific embodiment of the cross-sectional shape of the perimeter 48 of the layer 22.

The rod 42 may be made of a material which may prevent the light within the fiber 12 from being attenuated from the exterior surface 18 of the fiber 12. The rod 42 may reflect and/or may refract the light into the fiber 12 to reduce and/or to minimize the first amount of the light which may be attenuated from the fiber 12. As a result, the total amount of light which may be transmitted through the fiber 12 from the first end 14 of the fiber 12 into the passage 23 of the layer 22 may be increased and/or may be maximized by the rod 42.

The rod 42 may extend outwardly with respect to the second end 16 of the fiber 12 to prevent light from being attenuated from the second end 16 the fiber 12. The second end 46 of the rod 42 may be separated from the second end 18 of the fiber 12 by a distance R as illustrated in FIG. 6. The second end 46 of the rod 42 may be movable with respect to the second end 18 of the fiber 12. The second end 46 of the rod may move inwardly and/or may move outwardly with respect to the second end 18 of the fiber 12. As a result, the distance R may be increased and/or may be decreased by moving the rod 42 with respect to the fiber 12.

The distance R may correspond to and/or may be based on the first amount of light which may be attenuated from the fiber 12 and/or the second amount of light which may not be attenuated from the fiber 12. The first amount of light which may be attenuated from the fiber 12 may be increased and/or may be decreased by increasing and/or by decreasing the distance R between the second end 46 of the rod 42 and the second end 18 of the fiber. The second amount of light which may not be attenuated from the fiber 12 may be increased and/or may be decreased by increasing and/or by decreasing the distance R between the second end 46 of the rod 42 and the second end 18 of the fiber 12. The distance R may correspond to and/or may be based on the total amount of light which may be transmitted from the fiber 12 from the first end 14 of the fiber 12 into the passage 23 of the layer 22. Further, the distance R may correspond to and/or may be based on the distance P' between the second end 16 of the fiber 12 and the second end 26 of the layer 22 and/or the distance P''' between the first end 14 of the fiber 12 and the light detector 30. The total amount of light which may be transmitted from the first end 14 of the fiber 12 into the passage 23 of the layer 22 may be increased and/or may be decreased by increasing and/or by decreasing the distance R between the second end 46 of the rod 42 and the second end 18 of the fiber 12. The light detector 30 may determine the total amount of light within the passage 23 of the layer 22 to determine and/or to measure the distance R between the second end 46 of the rod 42 and/or the second 16 of the fiber 12.

The first end 44 of the rod 42 may be mechanically attached to the arm 208 for moving the rod 42 with respect to the fiber 12 and/or with respect to the layer 22. The microprocessor 204 may transmit the output signal to the transducer 206 for moving the rod 42 with respect to the fiber 12. The output signal from the microprocessor 204 may instruct the transducer 206 to control the arm 208 for moving the second end 46 of the rod 42 with respect to the second end 16 of the fiber 12. The arm 208 may move the second end 46 of the rod 42 inwardly and/or outwardly with respect to the second end 16 of the fiber 12.

The transducer 206 may increase, may decrease, may control, may alter and/or may change the distance R between the second end 16 of the fiber 12 and the second end 46 of the rod 42 via the arm 208. Further, the transducer 206 may increase, may decrease, may control, may alter and/or may change the distance P' between the second end 16 of the fiber 12 and the second end 26 of the layer 22 and/or the first end 14 of the fiber 12 and the light detector 30. The microprocessor 204 may increase, may decrease, may control, may alter and/or may change the distance R, the distance P' and/or the distance P''' via the transducer 206 and/or the arm 208. The microprocessor 204 and/or the transducer 206 may increase and/or may decrease the first amount of light which may be attenuated from the fiber 18 via the arm 208. As a result, the microprocessor 204 and/or the transducer 206 may increase and/or may decrease the total amount of light which may be transmitted from the fiber 12 via the rod 42 and/or the arm 208.

The light detector 30 may measure and/or may detect the total amount of light transmitted from the first end 14 of the fiber 12 of the pipe 40 to determine the distance P''' between the light detector 30 and the first end 14 of the fiber 12. The light detector 30 may transmit the first signal to the microprocessor 204 which may be indicative of the total amount of light transmitted from the fiber 18 of the pipe 40. The microprocessor 204 may be programmed to determine the distance R, the distance P' and/or the distance P''' via the second signal from the light detector 30.

The pipe 10 and/or the pipe 40 (hereinafter collectively known as "the pipes 10, 40") may be coupled with a linear actuator (not shown in the figures) to detect and/or to measure linear motion and/or rotational motion of the pipes 10, 40 with respect to the light detector 30. The pipes 10, 40 may be manufactured into a shape, such as, for example, a cylinder for detecting and/or measuring the light attenuated from the fiber 18 of the pipes 10, 40 as shown in FIGS. 1-6. However, the present invention should not be deemed as limited to a specific embodiment of the shape of the pipes 10, 40.

The first amount of light within the pipes 10, 40 may scatter and/or may diffuse outwardly from the exterior surface 18 and/or the perimeter 20 of the fiber 12. As a result, the total amount of light which may be transmitted via the first end 14 of the fiber 12 may be reduced and/or may be decrease by the first amount of light attenuated from, scattered from and/or diffused from the fiber 12. The pipes 10, 40 may be placed and/or may be located within a magnetic field and/or an electrical field to increase, to decrease, to control, to alter and/or to change the first amount of light which may be diffused and/or may be scattered from the fiber 12. The magnetic field and/or the electrical field may cause the exterior surface 18 of the fiber 12 to reflect and/or to refract inwardly with respect to the fiber 12. As a result, the magnetic field and/or the electrical field may alter and/or may change the total amount of light which may be transmitted from the first end 14 of the fiber 12 of the pipes 10, 40. Moreover, the magnetic field and/or the electrical field may change and/or may alter the total amount of light which may be detectable by the light detector 30 for determining the distance D, the distance R, the distance P' and/or the distance P'''.

FIG. 7 illustrates a system 200 having the microprocessor 204 which may be electrically connected to and/or in communication with the light detector 30, the light source 202 and/or the transducer 206. The microprocessor 302 may be located at a position which may be local or may be remote with respect to the pipe 10, 40. The microprocessor 204 may be programmed to control and/or to operated the light detector 30, the light source 202 and/or the transducer 206 for detecting the first amount of light attenuated from the fiber 12, the distance D, the distance R, the distance P' and/or the distance P'''. Further, the microprocessor 204 may be programmed to determine and/or to measure the distance D, the distance R, the distance P' and/or the distance P" via the second signal from the light detector 30. The microprocessor 204 may be programmed to control, to change and/or to alter the total light transmitted by and/or projected from the fiber 12 via the transducer 206 and/or the arm 208 which may be mechanically attached to the transducer 206.

The microprocessor 204 may transmit the output signal to the transducer 206 for controlling the arm 208 of the system 200. The transducer 206 may activate the arm 208 to move the second end 26 of the layer 22 and/or the second end 46 of the rod 42 with respect to the second end 16 of the fiber 12. The arm 208 may increase and/or may decrease the distance R, the distance P' and/or the distance P". The microprocessor 204 may be programmed to control, to alter and/or to change the first amount of light attenuated from the exterior surface 18 and/or from the perimeter 20 of the fiber 12 via the transducer 206 and/or the arm 208.

The pipes 10, 40 and/or the system 200 may have the fiber 12 for transmitting light from the light source 202 to the light detector 30 for determining the distance D between the fiber 12 and the light detector 30 and/or the first amount of light which may be attenuated from the fiber 12. The layer 22 may receive the fiber 12 to reflect and/or to refract light transmitted by the fiber 12 inwardly with respect to the fiber 12. The rod 42 may be located within the fiber 12 for preventing light from attenuating from the exterior surface 18 and/or the perimeter 20 of the fiber 12. The microprocessor 204 may transmit the output signal to the transducer 206 for activating the arm 208 which may move the second end 26 of the layer 22 inwardly or outwardly with respect to the second end 16 of the fiber 12. The first amount of light attenuated from the second end 16 of the fiber 12 and/or the total amount of light detectable by the light detector 30 may correspond to the distance P' and/or the distance P". The pipes 10, 40 and/or the system 200 may measure the distance P' and/or the distance P" based on the total amount of light transmitted from the first end 14 of the fiber 12 to the light detector 30.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A light pipe for measuring light attenuation, the light pipe comprising:

an optical fiber having a length defined between a first end and a second end wherein light is transmittable through the optical fiber between the first end and the second end wherein the light is projected into the optical fiber;

a layer having a passage and a length defined between a first end and a second end wherein the passage extends from the first end through the layer to the second end of the layer wherein the optical fiber is inserted into the passage of the layer wherein the first end of the optical fiber is adjacent to the first end of the layer wherein a portion of the optical fiber extends outwardly from the second end of the layer wherein the portion of the optical fiber attenuates a first amount of the light projected into the optical fiber;

a light detector connected to the first end of the layer wherein the optical fiber projects a second amount of light into the passage of the layer wherein the light detector is adjacent to the passage of the layer wherein the light detector determines the second amount of light within the passage wherein the second amount of light corresponds to the first amount of light attenuated from the portion of the optical fiber; and a microprocessor connected to the light detector wherein the microprocessor determines a distance between the optical fiber and the light detector wherein the distance between the optical fiber and the light detector corresponds to the second amount of light determined by the light detector.

2. The light pipe of claim 1 further comprising:
a light source associated with the optical fiber wherein the light source transmits light into the optical fiber.

3. The light pipe of claim 1 further comprising:
a rod connected to the optical fiber wherein the rod alters the first amount of light attenuated from the portion of the optical fiber.

4. The light pipe of claim 1 further comprising:
a transducer connected to the microprocessor wherein the transducer alters the first amount of light attenuated from the portion of the optical fiber.

5. The light pipe of claim 1 further comprising:
an arm connected to the layer wherein the arm changes the portion of the optical fiber extending outwardly with respect to the second end of the layer.

6. The light pipe of claim 1 wherein the microprocessor controls the first amount of light attenuated from the portion of the optical fiber.

7. A system for measuring light attenuation, the system comprising:

an optical fiber having a length defined between a first end and a second end wherein light illuminates the optical fiber between the first end and the second end wherein the first end of the optical fiber projects light;

a layer having a passage and a length defined between a first end and a second end wherein the passage extends from the first end of the layer through the layer to the second end of the layer wherein the optical fiber is located within the passage of the layer wherein the first end of the optical fiber is adjacent to the first end of the layer wherein a portion of the optical fiber extends outwardly with respect to the second end of the layer wherein the portion of the optical fiber attenuates an amount of light wherein the optical fiber is separated from the second end of the layer by a distance wherein the distance corresponds to the amount of light attenuated from the portion of the optical fiber; and a microprocessor connected to the optical fiber and the layer wherein the microprocessor determines the amount of light attenuated from the portion of the optical fiber wherein the microprocessor determines the distance between the optical fiber and the first end of the layer via the amount of light attenuated from the portion of the optical fiber.

8. The system of claim 7 further comprising:
a light detector connected to the first end of the layer and the microprocessor wherein the light detector measures light transmitted from the first end of the optical fiber.

9. The system of claim 7 further comprising:
a light source that projects light wherein the light from the light source illuminates the optical fiber.

10. The system of claim 7 further comprising:
a rod inserted into the optical fiber wherein the rod alters the amount of light attenuated from the portion of the optical fiber.

11. The system of claim 7 further comprising:
an arm connected to the layer wherein the arm changes the portion of the optical fiber extending outwardly with respect to the second end of the layer.

12. The system of claim 7 further comprising:
a transducer connected to the microprocessor wherein the transducer controls the amount of light attenuated from the portion of the optical fiber.

13. A method for measuring light attenuation, the method comprising the steps of:
providing a light pipe having an optical fiber and a layer wherein the layer has a length defined between a first end and a second end of the layer wherein the optical fiber has a length defined between a first end and a second end of the fiber wherein the optical fiber is inserted into the layer wherein the first end of the optical fiber is adjacent to the first end of the layer wherein a portion of the optical fiber extends outwardly with respect to the second end of the layer;
attenuating a first amount of light from the portion of the optical fiber extending outwardly with respect to the second end of the layer; and
determining a distance between the first end of the optical fiber and the first end of the layer wherein the distance corresponds to the first amount of light attenuated from the portion of the optical fiber.

14. The method of claim 13 further comprising the step of:
determining a second amount of light transmitted from the first end of the optical fiber wherein the second amount of light corresponds to the distance between the first end of the layer and the optical fiber.

15. The method of claim 13 further comprising the step of:
changing the distance between the first end of the layer and the optical fiber to alter the first amount of light attenuated from the optical fiber.

16. The method of claim 13 further comprising the step of:
inserting a rod into the optical fiber wherein the rod alters the first amount of light attenuated from the portion of optical fiber.

17. The method of claim 13 further comprising the step of:
moving the second end of the layer with respect to the second end of the optical fiber wherein the portion of the optical fiber is changed via the second end of the layer.

18. The method of claim 13 further comprising the step of:
changing the first amount of light attenuated from the portion of the optical fiber wherein the first amount corresponds to the portion of the optical fiber extending outwardly with respect to the layer.

19. The method of claim 13 further comprising the step of:
attaching a cap to the first end of the layer wherein the cap encloses the passage of the layer at the first end of the layer.

20. The method of claim 13 further comprising the step of:
connecting a microprocessor to the layer and the optical fiber wherein the microprocessor determines the distance between the optical fiber and the second end of the layer.

* * * * *